US006970217B2

United States Patent
Lim et al.

(10) Patent No.: US 6,970,217 B2
(45) Date of Patent: *Nov. 29, 2005

(54) REFLECTIVE AND TRANSFLECTIVE LIQUID CRYSTAL DISPLAY DEVICES

(75) Inventors: Joo-Soo Lim, Gyeongsangbuk-do (KR); Hong Jim Kim, Gyeongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 20 days.

This patent is subject to a terminal disclaimer.

(21) Appl. No.: 10/152,030

(22) Filed: May 22, 2002

(65) Prior Publication Data

US 2002/0176040 A1 Nov. 28, 2002

(30) Foreign Application Priority Data

May 22, 2001 (KR) ................................ 2001-28120

(51) Int. Cl.[7] ..................... G02F 1/1335; G02F 1/1339
(52) U.S. Cl. ........................ 349/114; 349/113; 349/153
(58) Field of Search ....................... 349/113–114, 139, 349/153, 190

(56) References Cited

U.S. PATENT DOCUMENTS

| | | | |
|---|---|---|---|
| 6,649,992 B2 * | 11/2003 | Lim | 257/435 |
| 2002/0145688 A1 * | 10/2002 | Sekiguchi | 349/114 |
| 2004/0041223 A1 * | 3/2004 | Lim | 257/435 |

* cited by examiner

Primary Examiner—Dung T. Nguyen
(74) Attorney, Agent, or Firm—Birch, Stewart, Kolasch & Birch, LLP

(57) ABSTRACT

An array substrate for a transflective liquid crystal display device which includes a substrate having a display region and a boundary region; a gate line disposed on the substrate; a first insulating layer disposed on the gate line; a data line disposed on the first insulating layer, the data line crossing the gate line and defining a pixel region with the gate line; a thin film transistor connected to the gate line and the data line; a second insulating layer disposed on the thin film transistor; a reflective plate disposed on the second insulating layer at the display region, the reflective plate being extended to the boundary region and having a transmission hole in the pixel region; a third insulating layer disposed on the reflective plate; and a pixel electrode disposed on the third insulating layer at the pixel region, the pixel electrode being connected to the thin film transistor.

14 Claims, 15 Drawing Sheets

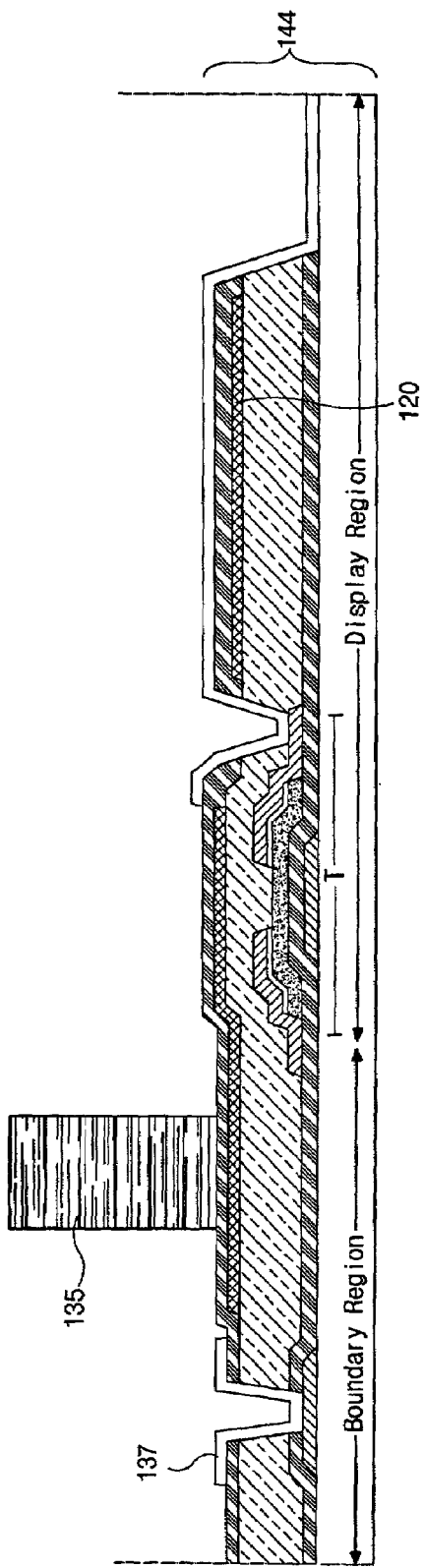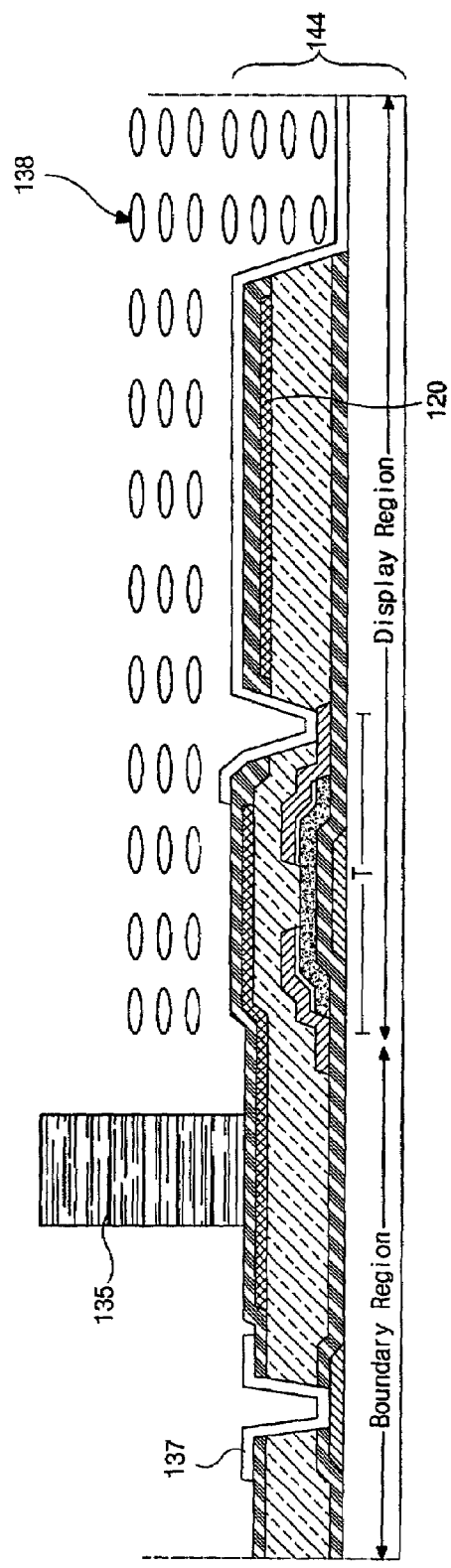
FIG. 7A
FIG. 7B

REFLECTIVE AND TRANSFLECTIVE LIQUID CRYSTAL DISPLAY DEVICES

BACKGROUND OF THE INVENTION

This application claims the benefit of Korean Patent Application No. 2001-28120, filed on May 22, 2001 in Korea, which is hereby incorporated by reference for all purposes as if fully set forth herein.

FIELD OF THE INVENTION

The present invention relates to reflective and transflective liquid crystal display (LCD) devices and more particularly, to reflective and transflective LCD devices using a dispensing method and a fabricating method thereof.

DISCUSSION OF THE RELATED ART

Generally, liquid crystal display (LCD) devices include upper and lower substrates, where color filters and thin film transistors (TFTs) are respectively disposed. A liquid crystal layer is interposed between the upper substrate and the lower substrate. Transmittance of the LCD devices is controlled by applying a voltage to common electrodes and pixel electrodes so that characters and images are displayed with a light shutter effect.

A fabrication process of a liquid crystal cell will be explained briefly.

After the upper and lower substrates are aligned and attached so that the surfaces of the common electrodes and pixel electrodes face each other, the liquid crystal material is injected between the substrates through an injection hole and the injection hole is then sealed. A polarizer is then attached to each outer surface of the upper and lower substrates.

The fabrication process of the liquid crystal cell seldom includes repeated steps compared with the fabrication processes of the TFT and the color filter. The process includes forming an orientation film, forming a cell gap and cutting the cell.

FIG. 1 is a flow chart illustrating a conventional fabrication process of a liquid crystal cell.

In step st1, a lower substrate is prepared by forming an array of TFTs and pixel electrodes on the lower substrate.

In step st2, an orientation film is formed on the lower substrate. Formation of the orientation film includes depositing a polymeric thin film on the substrate and subsequently performing a uniform rubbing process. The rubbing process determines an initial alignment direction and supplies the normal operation of the liquid crystal layer and the uniform display characteristic of the LCD device. Typically, an organic material of the polyamide series is used as the orientation film. The rubbing method includes rubbing the orientation film in a specific direction with a rubbing cloth, thereby aligning the liquid crystal molecules along or in the rubbing direction.

In step st3, a seal pattern is formed on the lower substrate. In the liquid crystal cell, the seal pattern serves two functions: forming a gap for the injection of the liquid crystal material and confining the injected liquid crystal material. The seal patterning process forms a desired pattern by the application of a thermosetting plastic. A screen-printing method using a screen mask is typically used for this process.

In step st4, a spacer is sprayed on the lower substrate. The size of the spacer used in the liquid crystal cell maintains a precise and uniform gap between the upper and lower substrates. Accordingly, the spacers are uniformly sprayed on the lower substrate. The spacer spray method can be divided into two different types: a wet spray method that involves spraying a mixture of alcohol and spacer material and a dry spray method that involves spraying spacer material alone. Furthermore, the dry spray method can be sub-divided into two different types: an electrostatic spray method that uses electrostatic force, and a non-electric spray method that uses gas pressure. Since the liquid crystal cell structure is susceptible to damage from static electricity, the non-electric method is widely used.

In step st5, the upper and lower substrates are aligned and attached. The alignment margin between the upper and lower substrates is determined by the device design, and accuracy within a few micrometers is generally required. If the alignment margin is exceeded, the liquid crystal cell will not operate adequately due to light leakage.

In step st6, the attached liquid crystal substrate is divided into unit cells. Generally, a plurality of unit cells are formed on a large sized glass substrate and then divided through a cutting process. In the fabrication process of the initial LCD devices, the unit cells are separated after simultaneous injection of the liquid crystal material into the unit cells. However, injection of liquid crystal material is commonly performed after a large sized liquid crystal substrate is cut into unit cells due to an increase in the cell size. The cell cutting process includes a scribe process that forms cutting lines on a surface of the substrate using a diamond pen, the hardness of which is higher than that of the glass substrate, and a breaking process that divides the substrate by force.

In step st7, a liquid crystal material is injected into the unit cells. The unit cell has a size of several hundred square centimeters with a gap of several micrometers. Accordingly, a vacuum injection method using pressure difference between the interior and exterior of the unit cell is commonly used as an effective injection method.

The injection method of liquid crystal material is classified into a dip method or a contact method. In the dip method, the injection hole is dipped into a liquid crystal tank under a vacuum state and the liquid crystal material is injected due to a pressure difference between interior and exterior of an LCD panel. In the contact method, the injection hole contacts the surface of the liquid crystal material in the liquid crystal tank. However, the injection method using a pressure difference under a vacuum takes a long period of time and also the injection hole may become contaminated.

To solve the above problems, a dispensing method is suggested. In the dispensing method, a sealant is printed at a boundary of a plurality of cells on an array substrate and then the liquid crystal material is sufficiently dropped in a region defined by the sealant using a means such as a dispenser. A process time is reduced and the production yield is dramatically improved because the liquid crystal layer is formed in the LCD panel in a short period of time.

FIGS. 2A to 2F are schematic plan views and cross-sectional views showing the fabricating process of a liquid crystal cell.

In FIGS. 2A and 2B, a first substrate 2 having a plurality of liquid crystal cells "A" is provided. The first substrate 2 has a sub-color filter corresponding to a pixel electrode of a second substrate and a black matrix corresponding to a region between the adjacent pixel electrodes.

In FIGS. 2C and 2D, a sealant 6 is printed on a second substrate 4 at regions corresponding to the boundary of each liquid crystal cell "A." The second substrate 4 has an array line, a pixel electrode and a switching device, i.e., a thin film transistor (TFT). Next, a liquid crystal layer is formed at an interior 8 of the sealant with a dispenser.

In FIGS. 2E and 2F, the first substrate 2 is attached to the second substrate 4 having the liquid crystal layer to form a liquid crystal panel 10. Then a shielding mask 12 is disposed over the liquid crystal panel 10. The shielding mask 12 includes a transmission region "B" and a shield region "C." The transmission region "B" corresponds to the sealant 6 of the liquid crystal panel 10 and the shield region "C" corresponds to the interior of the sealant 6, i.e., a display area "D" of the liquid crystal panel 10. The display area "D" is shielded to prevent a channel of the TFT from being exposed to ultraviolet (UV) light during the hardening process of the sealant. Even though the first substrate has the black matrix corresponding to the TFT, the incident light may be scattered by a reflective plate and influence the channel. Accordingly, the shielding mask should be used for preventing this influence.

After hardening the sealant 6 with UV light, the first and second substrates 2 and 4 are completely attached through a hot press process. The attached substrates are then cut into a plurality of unit cells.

However, when the dispensing method is used for the forming process of the liquid crystal layer, the UV light should be irradiated to the sealant for hardening. Therefore, the black matrix should not be formed on the first substrate at a region corresponding to the sealant. Therefore, to prevent the pixel region from being exposed to UV light, larger margins are necessary when a boundary of the liquid crystal panel is designed.

FIG. 3 is a schematic plan view of a conventional transflective LCD device where a liquid crystal layer is formed through the dispensing method and FIG. 4 is a cross-sectional view taken along a line IV—IV of FIG. 3.

In FIGS. 3 and 4, a second substrate 14, referred to as an array substrate, for a transflective LCD device has a pixel region "P" including a transmissive portion "E" and a reflective portion "F." The transmissive portion "E" and the reflective portion "F" have a transflective electrode formed by overlapping a transparent electrode 16 and a reflective electrode 20 having a transmissive hole 18. The pixel region "P" is defined by a gate line 22 and a data line 24 crossing the gate line 22. A gate pad 23 and a data pad (not shown) having a specific area are disposed at an end of the gate line 22 and the data line 24, respectively. A TFT "T" including a gate electrode 26, an active layer 32, and source and drain electrodes 28 and 30 are connected to the gate and data lines 22 and 24.

A black matrix 36 and a color filter 37 are formed on a first substrate 34, referred to as a color filter substrate, said first substrate corresponding to the second substrate 14. The black matrix 36 corresponding to the TFT "T" of the second substrate 14 shields an active layer 32 from incident light. Since a sealant 6 is an UV curable resin, the sealant should be irradiated by UV light and thus the black matrix 36 should not be formed over the sealant 6.

However, in the transflective LCD panel of the above structure, since the black matrix is formed on the first substrate, the aperture ratio decreases. Moreover, since the black matrix is not formed at a region corresponding to the sealant, larger margins are necessary to protect the display region when a boundary of the liquid crystal panel is designed. Therefore, it is difficult to apply the transflective LCD panel of the above structure to a compact product such as a mobile phone. Further, the fabrication cost are increased due to the use of an additional shielding mask. These problems do not occur only in a transflective LCD device but also in a reflective LCD device.

SUMMARY OF THE INVENTION

Accordingly, the present invention is directed to an array substrate for a liquid crystal display device that substantially obviates one or more of problems created due to the limitations and disadvantages of the related art.

An advantage of the present invention is to provide an array substrate for a transflective or reflective liquid crystal display device in which the reflective plate is extended to the boundary of the display region so that an additional shielding mask for hardening and a black mask are not necessary.

Additional features and advantages of the present invention will be set forth in the description which follows, and in part will be apparent from the description, or may be learned by the practice of the present invention. The objectives and other advantages of the present invention will be realized and attained by the structure particularly pointed out in the written description and claims hereof as well as the appended drawings.

To achieve these and other advantages and in accordance with the purpose of the present invention, as embodied and broadly described, an array substrate for a transflective liquid crystal display device is provided which includes: a substrate having a display region and a boundary region; a gate line disposed on the substrate; a first insulating layer disposed on the gate line; a data line disposed on the first insulating layer, the data line crossing the gate line and defining a pixel region with the gate line; a thin film transistor connected to the gate line and the data line; a second insulating layer disposed on the thin film transistor; a reflective plate disposed on the second insulating layer at the display region, the reflective plate being extended to the boundary region and having a transmission hole in the pixel region; a third insulating layer disposed on the reflective plate; and a pixel electrode disposed on the third insulating layer at the pixel region, the pixel electrode being connected to the thin film transistor.

In another aspect of the present invention, the transflective liquid crystal display device includes: first and second substrates facing each other and spaced apart from each other, the second substrate having a display region and a boundary region; a common electrode disposed on an inner surface of the first substrate; a gate line disposed on an inner surface of the second substrate; a first insulating layer disposed on the gate line; a data line disposed on the first insulating layer, the data line crossing the gate line and defining a pixel region with the gate line; a thin film transistor connected to the gate line and the data line; a second insulating layer disposed on the thin film transistor; a reflective plate disposed on the second insulating layer at the display region, the reflective plate being extended to the boundary region and having a transmission hole in the pixel region; a third insulating layer disposed on the reflective plate; a pixel electrode disposed on the third insulating layer in the pixel region, the pixel electrode being connected to the thin film transistor; a sealant disposed over the reflective plate at the boundary region; and a liquid crystal layer interposed between the common and pixel electrodes.

In a further aspect of the present invention, a fabricating method for a transflective liquid crystal display device includes: forming a common electrode on a first substrate; forming a gate line on a second substrate having a display region and a boundary region; forming a first insulating layer on the gate line; forming a data line on the first insulating layer, the data line crossing the gate line and defining a pixel region with the gate line; forming a thin film transistor connected to the gate line and the data line; forming a second insulating layer on the thin film transistor; forming a reflective plate on the second insulating layer at the display region, the reflective plate being extended to the boundary region and having a transmission hole at the pixel region; forming a third insulating layer on the reflective plate; forming a pixel electrode on the third insulating layer in the pixel region, the pixel electrode being connected to the thin film transistor; forming a sealant over the reflective plate at the boundary region; dispensing liquid crystal molecules to the interior of the sealant; attaching the first and second substrates; and hardening the sealant by irradiating light.

In yet another aspect of the present invention, an array substrate for a reflective liquid crystal display device includes: a substrate having a display region and a boundary region; a gate line disposed on the substrate; a first insulating layer disposed on the gate line; a data line disposed on the first insulating layer, the data line crossing the gate line and defining a pixel region with the gate line; a thin film transistor connected to the gate line and the data line; a second insulating layer disposed on the thin film transistor; a reflective plate disposed on the second insulating layer at the display region, the reflective plate being extended to the boundary region and having an open portion over the thin film transistor; a third insulating layer disposed on the reflective plate; and a pixel electrode disposed on the third insulating layer at the pixel region, the pixel electrode being connected to the thin film transistor through the open portion.

Still another aspect of the present invention, the reflective liquid crystal display device includes: first and second substrates facing each other and spaced apart from each other, the second substrate having a display region and a boundary region; a common electrode disposed on an inner surface of the first substrate; a gate line disposed on an inner surface of the second substrate; a first insulating layer disposed on the gate line; a data line disposed on the first insulating layer, the data line crossing the gate line and defining a pixel region with the gate line; a thin film transistor connected to the gate line and the data line; a second insulating layer disposed on the thin film transistor; a reflective plate disposed on the second insulating layer at the display region, the reflective plate being extended to the boundary region and having an open portion over the thin film transistor; a third insulating layer disposed on the reflective plate; a pixel electrode disposed on the third insulating layer at the pixel region, the pixel electrode being connected to the thin film transistor through the open portion; a sealant provided over the reflective plate at the boundary region; and a liquid crystal layer interposed between the common and pixel electrodes.

In still a further aspect of the present invention, the fabricating method of a reflective liquid crystal display device includes: forming a common electrode on a first substrate; forming a gate line on a second substrate having a display region and a boundary region; forming a first insulating layer on the gate line; forming a data line on the first insulating layer, the data line crossing the gate line and defining a pixel region with the gate line; forming a thin film transistor connected to the gate line and the data line; forming a second insulating layer on the thin film transistor; forming a reflective plate on the second insulating layer at the display region, the reflective plate being extended to the boundary region and having an open portion over the thin film transistor; forming a third insulating layer on the reflective plate; forming a pixel electrode on the third insulating layer at the pixel region, the pixel electrode being connected to the thin film transistor through the open portion; forming a sealant over the reflective plate at the boundary region; dispensing liquid crystal molecules to the interior of the sealant; attaching the first and second substrates; and hardening the sealant by irradiating light.

It is to be understood that both the foregoing general description and the following detailed description are exemplary and explanatory and are intended to provide a further explanation of the present invention as claimed, and should not be considered as limiting.

BRIEF DESCRIPTION OF THE DRAWINGS

The accompanying drawings, which are included to provide a further understanding of the present invention and are incorporated in and constitute a part of this specification, illustrate embodiments of the invention and together with the description serve to explain the principles of the present invention, and wherein:

FIG. 4 illustrates the structure of a mask slit and a light intensity profile that results from the mask structure according to the prior art;

FIGS. 7A to 7C are schematic cross-sectional views showing the steps of a fabricating process of a transflective LCD device according to the first embodiment of the present invention;

DETAILED DESCRIPTION OF THE INVENTION

Reference will now be made in detail to the illustrated embodiments of the present invention, as shown in the accompanying drawings.

Figure 1:
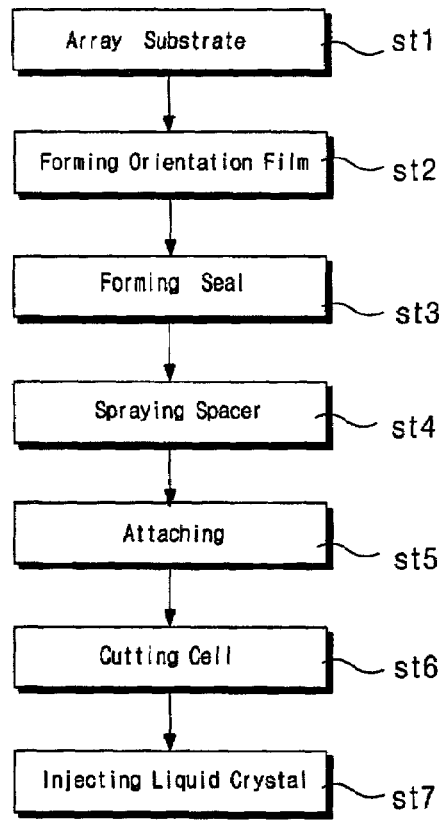
FIG. 1 is a flow chart illustrating a conventional fabrication process of a liquid crystal cell.
Figure 2A:
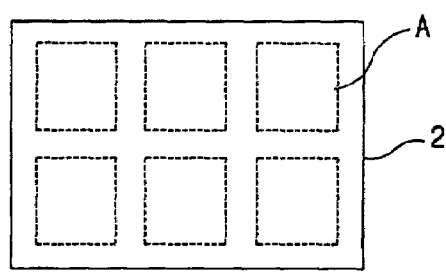
FIGS. 2A to 2F are schematic plan views and cross-sectional views showing a fabricating process of a liquid crystal cell.
Figure 2B:
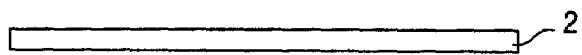
Figure 2C:
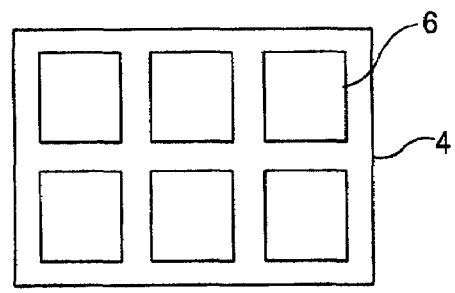
Figure 2D:
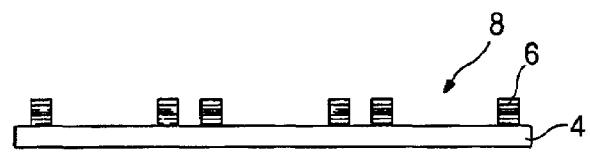
Figure 2E:
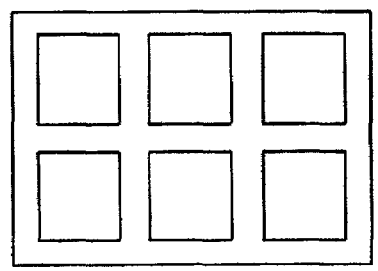
Figure 2F:
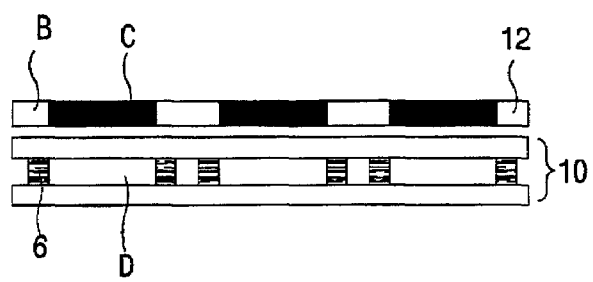
Figure 3:
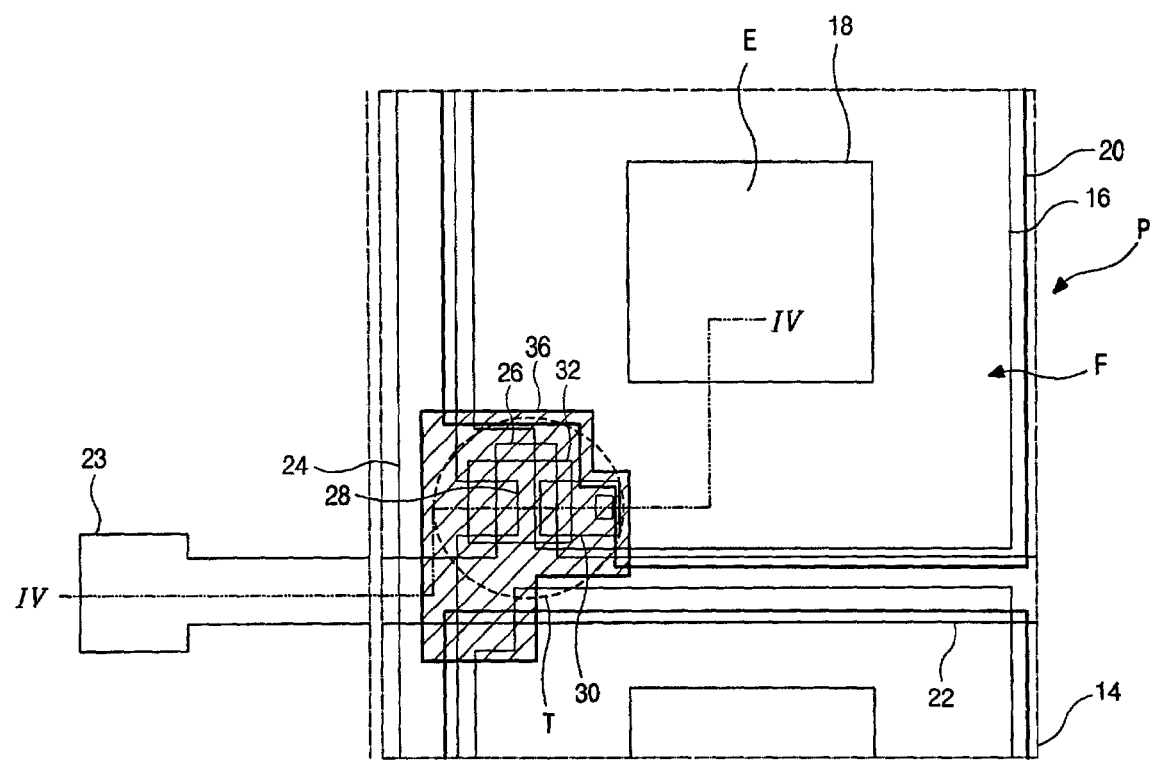
FIG. 3 is a schematic plan view of a conventional transflective LCD device wherein a liquid crystal layer is formed through the dispensing method.
Figure 4:
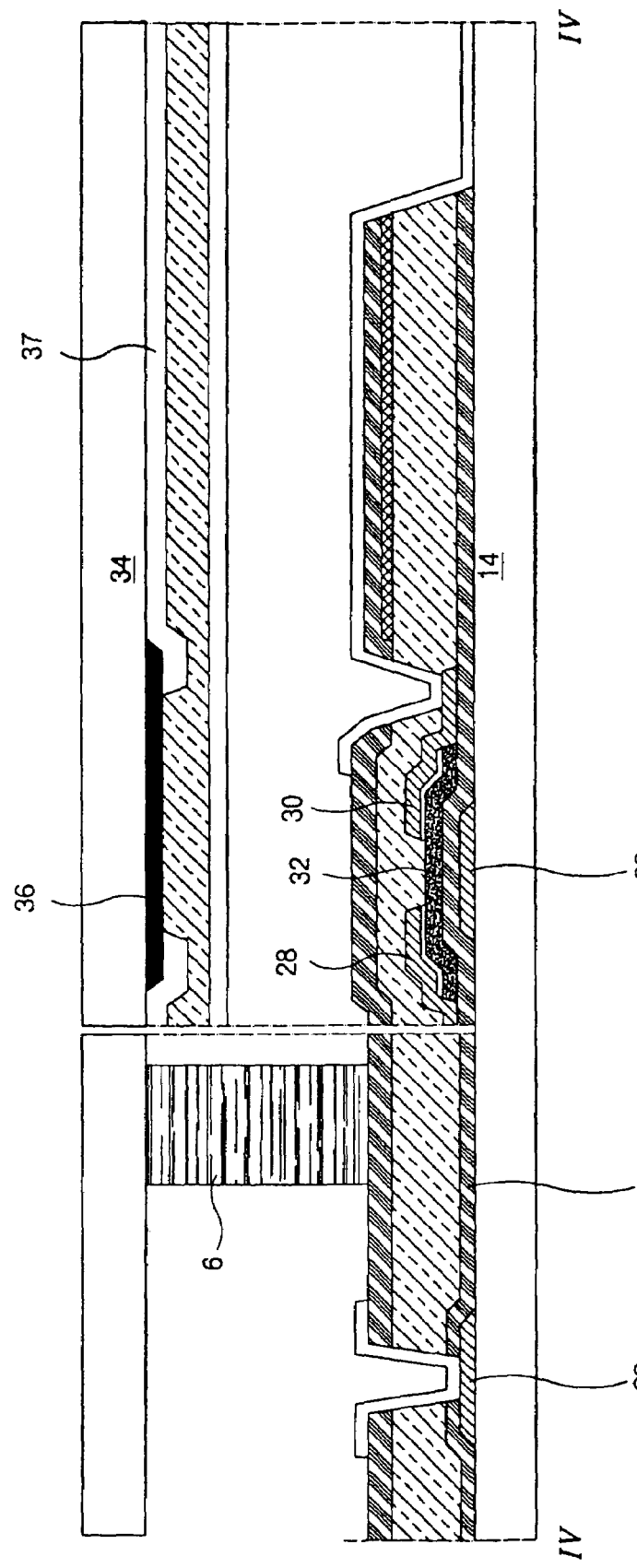
FIG. 4 is a cross-sectional view taken along a line IV—IV of FIG. 3.
Figure 5:
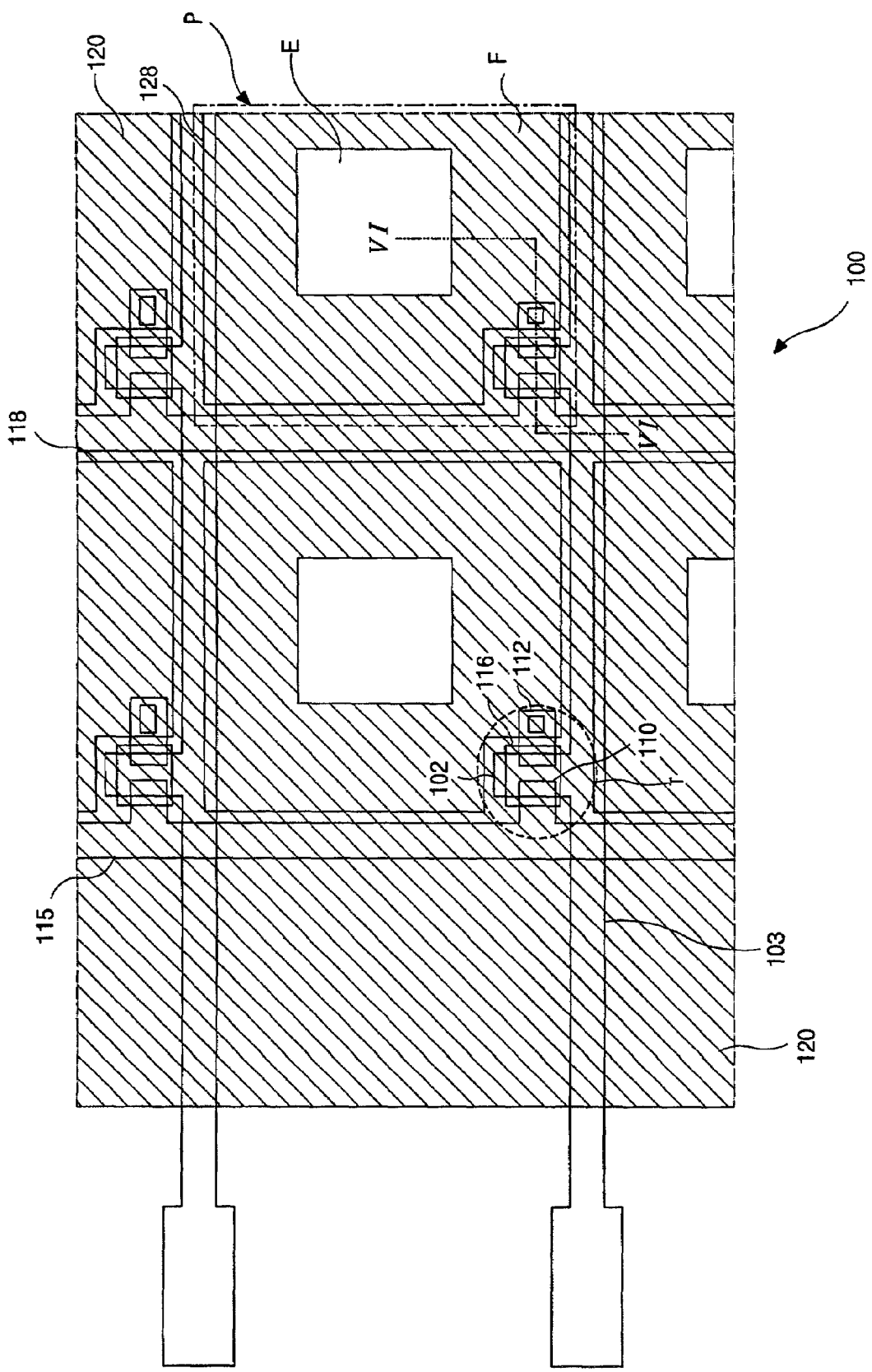
FIG. 5 is a plan view of an array substrate for a transflective liquid crystal display device according to a first embodiment of the present invention.

FIG. 5 is a plan view of an array substrate for a transflective liquid crystal display device according to the first embodiment of the present invention.

In FIG. 5, a transflective electrode of an array substrate 100 for a transflective LCD device is composed of transparent and reflective electrodes 130 and 120. Here, the reflective electrode 120 is a reflective plate that is not connected to a drain electrode 112. Since the reflective plate 120 is electrically floating, i.e., insulated from an electrical source, the reflective plate 120 may be extended over a TFT "T" of the array substrate 100 to be formed on the entire surface of the array substrate 100.

Figure 6A:
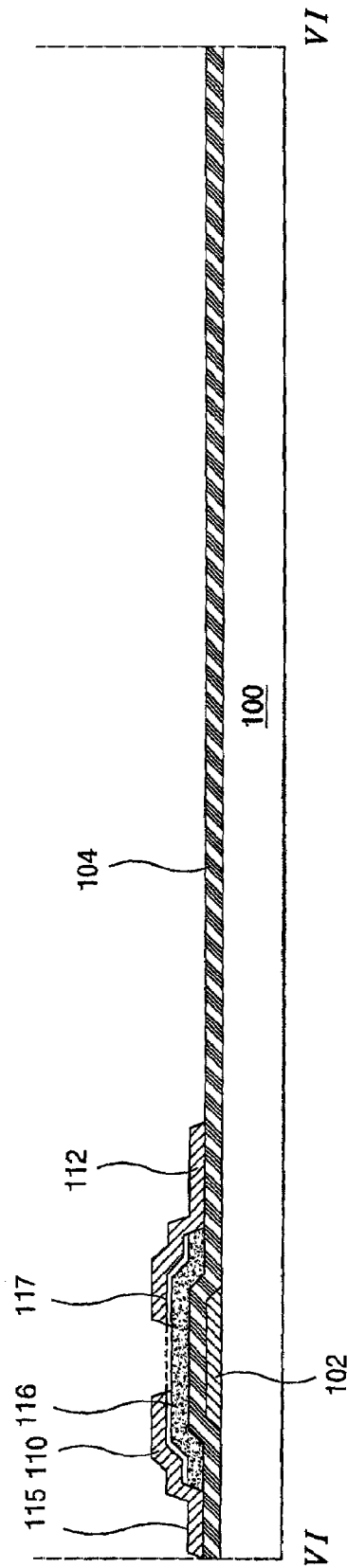
FIGS. 6A to 6D are schematic cross-sectional views showing the steps of a fabricating process of an array substrate, taken along line VI—VI of FIG. 5.
Figure 6B:
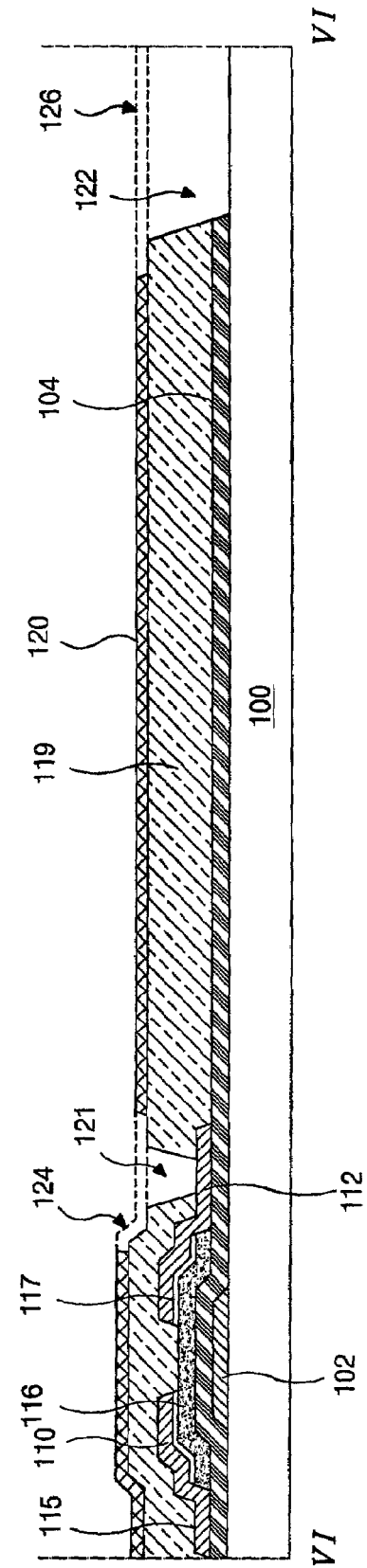
Figure 6C:
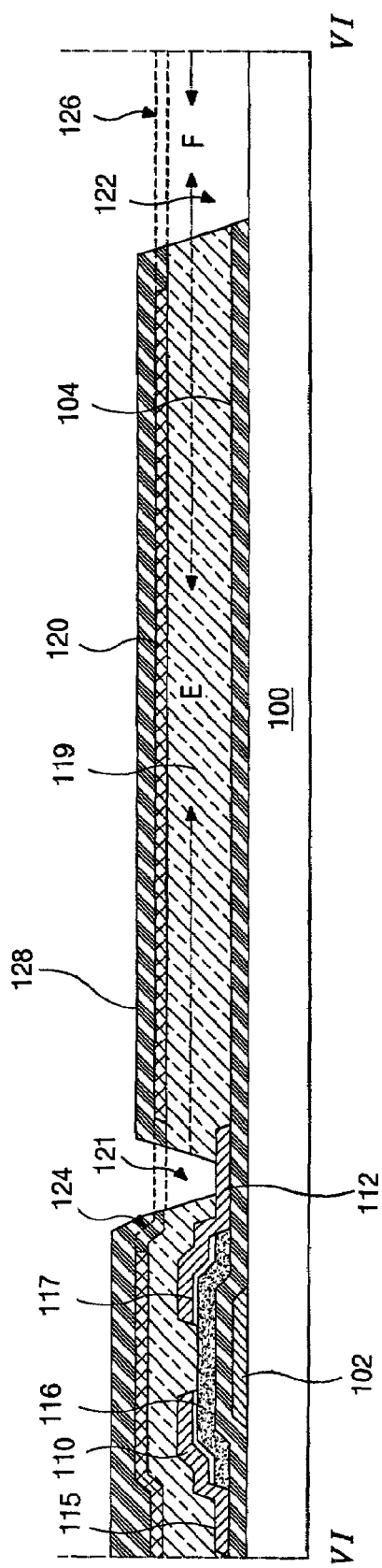

FIGS. 6A to 6C are schematic, cross-sectional views showing the steps of fabricating process of an array substrate, taken along a line VI—VI of FIG. 5.

FIG. 6A, a gate electrode 102 of a single metal layer such as aluminum (Al), aluminum neodymium (AlNd), tungsten (W), chromium (Cr) or molybdenum (Mo), or a double metal layer such as Al/Cr or Al/Mo is formed on a substrate 100. Since material for the gate electrode 102 is important to operation of an LCD device, aluminum of low resistance has been widely used to reduce RC delay. However, since for pure aluminum, corrosion resistance to chemical solutions is low and hillock readily forms at high temperature, an alloy or a double layer is usually adopted for the aluminum line.

A first insulating layer 104 of inorganic insulating material such as silicon nitride (SiNx) or silicon oxide (SiO$_2$), or an organic insulating material such as benzocyclobutene (BCB) or an acrylic resin is formed on the gate electrode 102. A semiconductor layer including an active layer 116 of amorphous silicon and an ohmic contact layer 117 of doped amorphous silicon is formed on the first insulating layer 104 over the gate electrode 102. Source and drain electrodes 110 and 112, and a data line 115 of conductive metallic material are formed on the ohmic contact layer 117. The data line 115 is perpendicularly extended from the source electrode 110.

In FIG. 6B, a second insulating layer 119 is formed on the entire surface of the substrate 100 by depositing thereon one of the organic insulating materials, e.g., BCB and/or an acrylic resin. Next, a first contact hole 121 corresponding to the drain electrode 112 and a groove 122 corresponding to a transmissive portion of a pixel region are formed by etching the second insulating layer 119. Even though the groove 122 is formed to reduce a color shift by making light paths of reflective and transmissive portions equal, the groove 122 is not essential and may be omitted. Next, a reflective plate 120 having an open portion 124 and a transmission hole 126 is formed on the second insulating layer 119 through depositing and patterning one of metal groups including Al and Al alloys such as AlNd. The open portion 124 and the transmission hole 126 correspond to the drain electrode 112 and the groove 122, respectively.

In FIG. 6C, a third insulating layer 128 is formed on an entire surface of the substrate 100 by depositing one of the inorganic insulating materials, such as SiNx and SiO$_2$. Portions corresponding to the open portion 124 and the transmission hole 126 are etched to expose the drain electrode 112 and the substrate of the transmissive portion, respectively. Even though the contact hole and the groove are formed through two mask processes for the second and third insulating layers, they may be formed through only one mask process after forming the third insulating layer, in another embodiment.

Figure 6D:
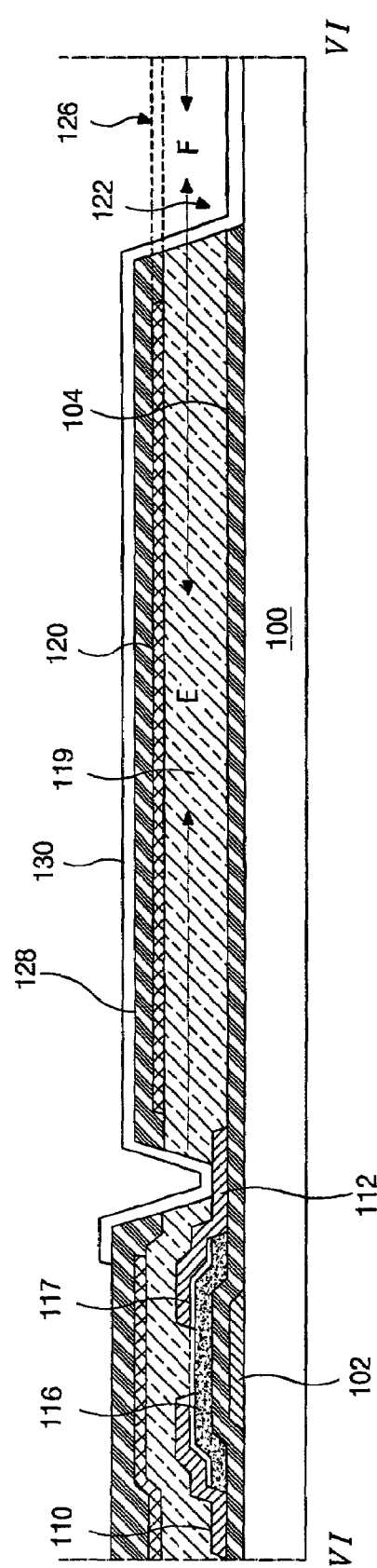

In FIG. 6D, a pixel electrode 130 connected to the drain electrode 112 is formed in the pixel region by depositing and patterning one of the transparent conductive metal groups, such as indium tin oxide (ITO) and/or indium zinc oxide (IZO).

Figure 7C:
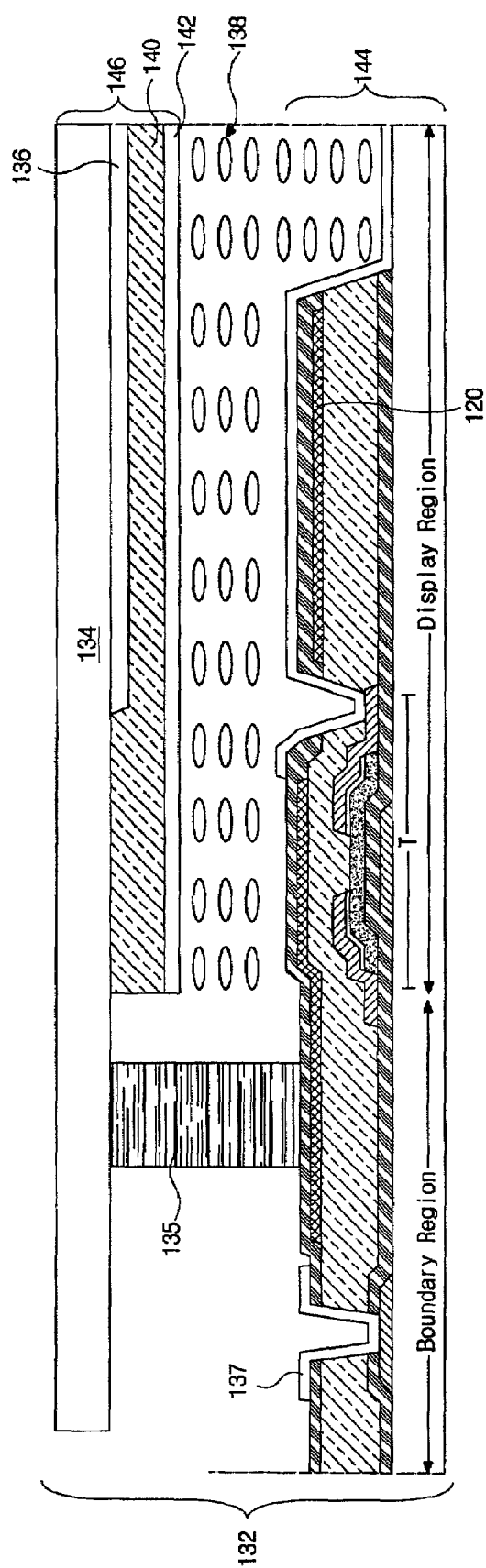

FIGS. 7A to 7C are schematic cross-sectional views showing a fabricating process of a transflective LCD device according to the first embodiment of the present invention.

In FIG. 7A, a light curable sealant 135 is formed at the boundary region of an array substrate 144 provided through the process steps of FIGS. 6A to 6D. The sealant 135 is formed adjacent to a driving part at the boundary of the array substrate 114 and disposed between a signal line (the gate or data lines) and a pad 137 at an end of the gate or data lines.

In FIG. 7B, liquid crystal molecules 138 are dispensed interiorly of the sealant 135 using a dispenser. Since more liquid crystal molecules can fill the interior in a short period of time through the dispensing method, the process time can be substantially reduced.

In FIG. 7C, a color filter substrate 146 is attached to the array substrate 144 to form a liquid crystal panel 132. A color filter layer 136, a planarization layer 140 and a common electrode 142 are subsequently formed on a substrate 134 to produce the color filter substrate 146. If ultraviolet (UV) light is irradiated from an upper part of the color filter substrate 146, the sealant 135 at the boundary of the liquid crystal panel 132 is hardened so that the attachment of the color filter substrate 146 and the array substrate 144 becomes firmer.

As a result, the color filter substrate 146 has only color filter layer 136 in the transflective LCD device 132 according to the first embodiment of the present invention. Even though the black matrix corresponding to a TFT "T" of the array substrate 144 is not formed on the color filter substrate 146, the reflective plate 120 of the array substrate 144 may shield the TFT "T." Therefore, the aperture ratio is improved. Moreover, when the sealant 135 is hardened with the UV light, the display region including the pixel region is not exposed to the UV light without an additional shield mask.

Figure 8:
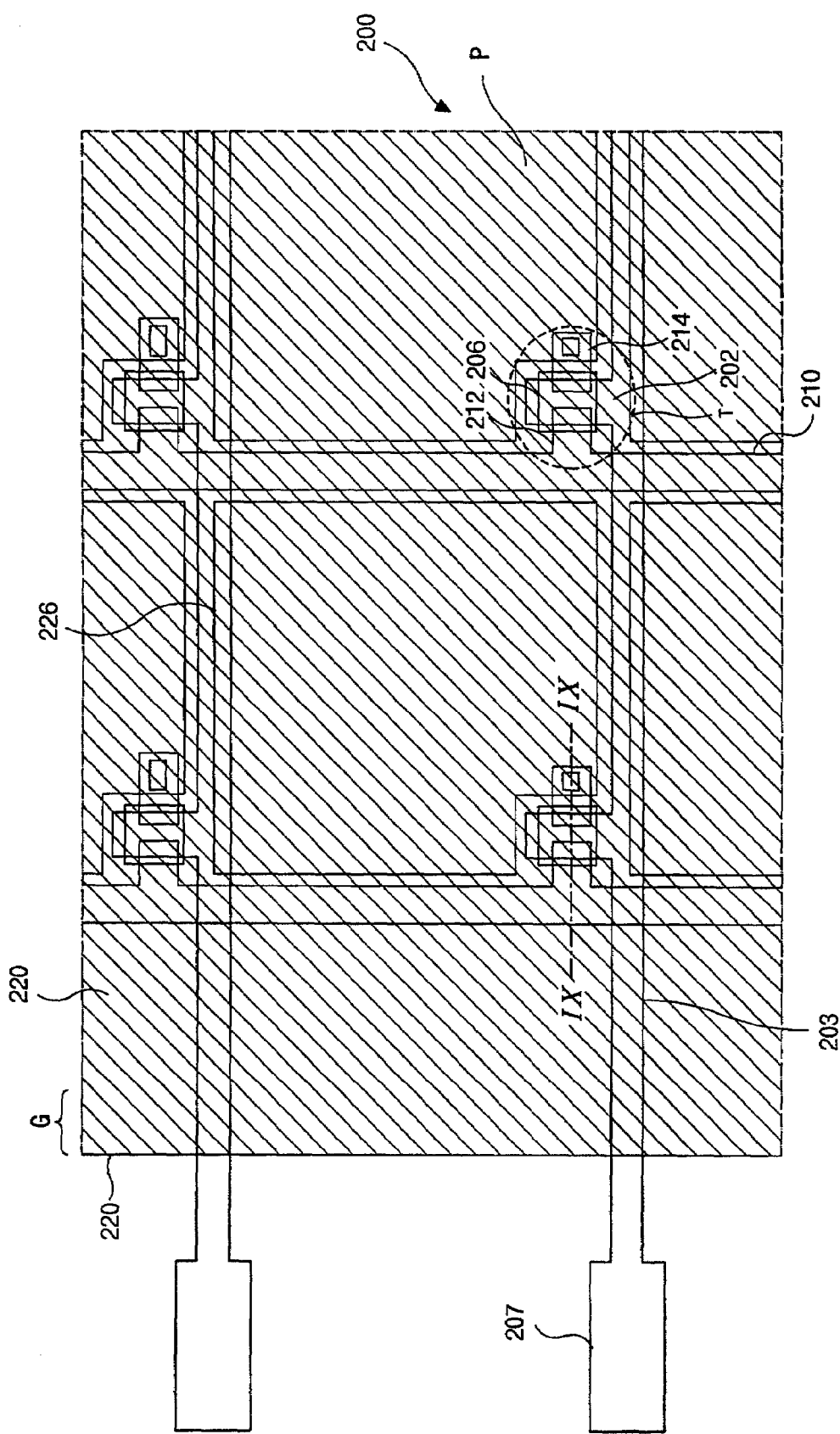
FIG. 8 is a schematic plan view of an array substrate for a reflective liquid crystal display device according to a second embodiment of the present invention.

FIG. 8 is a schematic plan view of an array substrate for a reflective liquid crystal display device according to a second embodiment of the present invention.

In FIG. 8, a reflective plate 220 and a transparent electrode 226 are formed on an array substrate 200. The reflective plate 220 is extended to a region "G," a boundary region of a liquid crystal panel, where a sealant (not shown) is formed. The transparent electrode 226 is connected to each drain electrode 214 to drive each pixel region "P" independently. A source electrode 212 is spaced apart from the drain electrode 214 and extended from a data line 210. A gate electrode 202 is connected to a gate line 203 and a gate pad 207 is formed at an end of the gate line 203.

Figure 9A:
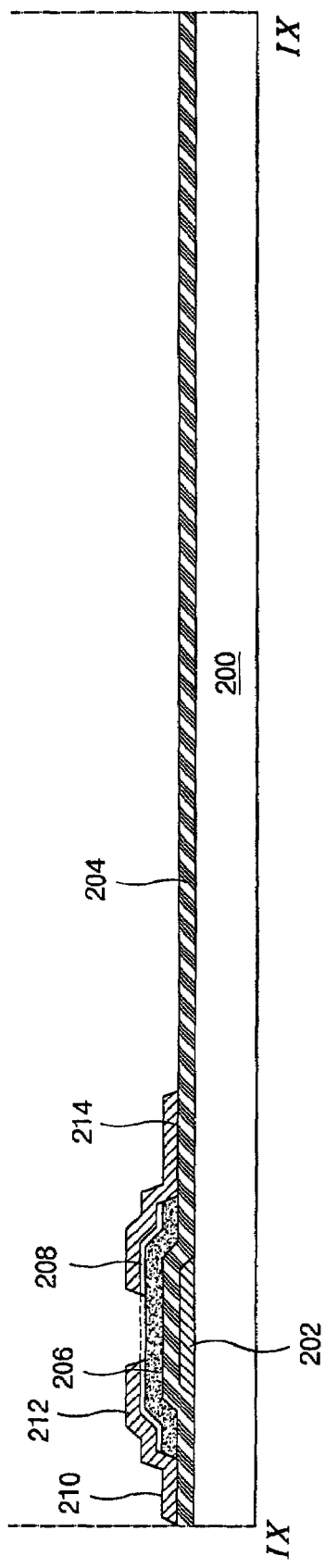
FIGS. 9A to 9D are schematic cross-sectional views showing the steps of a fabricating process of an array substrate and taken along a line IX—IX of FIG. 8.
Figure 9B:
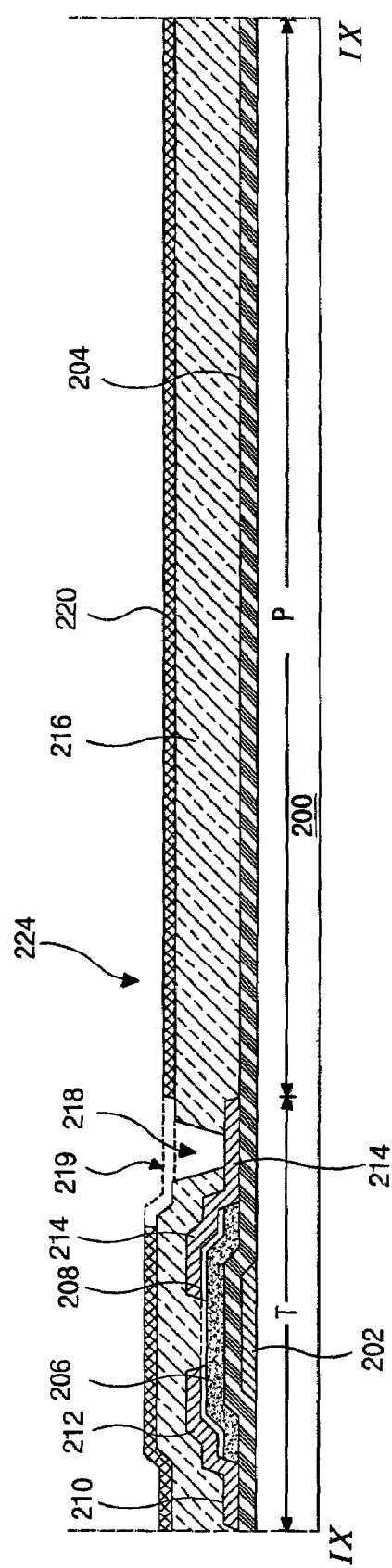
Figure 9C:
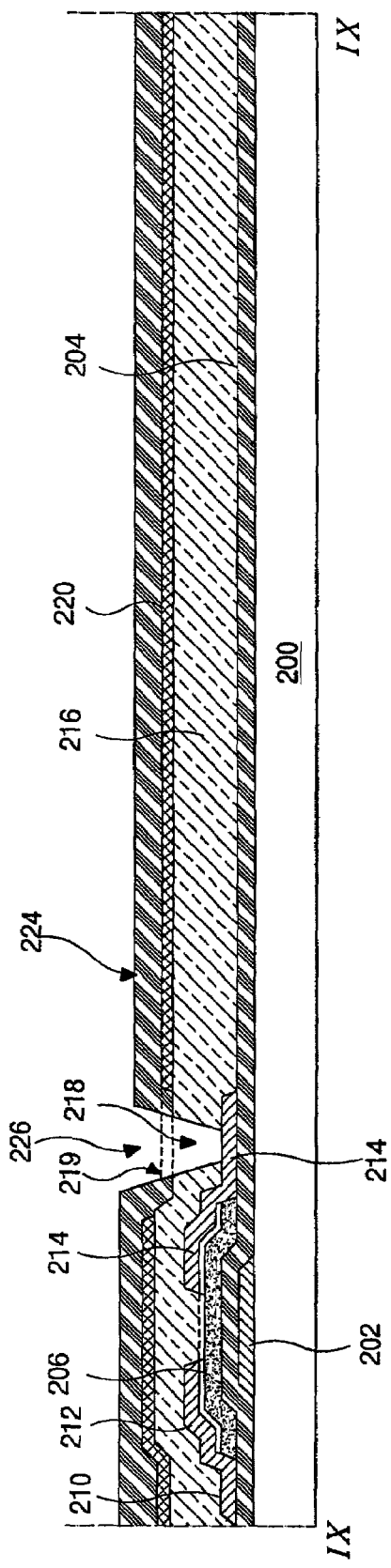

FIGS. 9A to 9D are schematic cross-sectional views showing a fabricating process of an array substrate taken along a line IX—IX of FIG. 8. Since the process of FIGS. 9A to 9C is similar to that of FIGS. 6A to 6C, FIGS. 9A to 9C will be only briefly explained.

In FIG. 9A, a gate electrode 202 of a single metal layer such as aluminum (Al), aluminum neodymium (AlNd), tungsten (W), chromium (Cr) or molybdenum (Mo), or a double metal layer such as Al/Cr or Al/Mo is formed on a substrate 200. A first insulating layer 204 of inorganic insulating material such as silicon nitride (SiNx) or silicon oxide (SiO$_2$), or an organic insulating material such as benzocyclobutene (BCB) and/or an acrylic resin is formed on the gate electrode 202. A semiconductor layer including an active layer 206 of amorphous silicon and an ohmic contact layer 208 of doped amorphous silicon is formed on the first insulating layer 204 over the gate electrode 202. Source and drain electrodes 212 and 214, and a data line 210 of conductive metallic material are formed on the ohmic contact layer 208.

In FIG. 9B, a second insulating layer 216 is formed on the entire surface of the substrate 200 by depositing thereon an organic insulating material, such as BCB and/or an acrylic resin. Next, a first contact hole 218 corresponding to the drain electrode 214 is formed by etching the second insulating layer 216. Next, a reflective plate 220 having an open portion 219 is formed on the second insulating layer 216 by depositing and patterning one of a metal group, such as Al and/or an Al alloy such as AlNd. The open portion 219 corresponds to the first contact hole 218. The reflective plate 220 is extended to a region where a sealant is printed in the next process. Since the reflective plate 220 is formed on an entire surface of the pixel region "P," a corresponding TFT "T" is shielded from light. Moreover, since the reflective plate 220 is not connected to the drain electrode 214, an additional transparent electrode to drive the pixel region "P" independently is formed.

In FIG. 9C, a third insulating layer 224 is formed on the entire surface of the substrate 200 by depositing thereon an inorganic insulating material, such as SiNx and/or $SiO_2$. A second contact hole 226 corresponding to the open portion 219 is formed to expose the drain electrode 214.

Figure 9D:
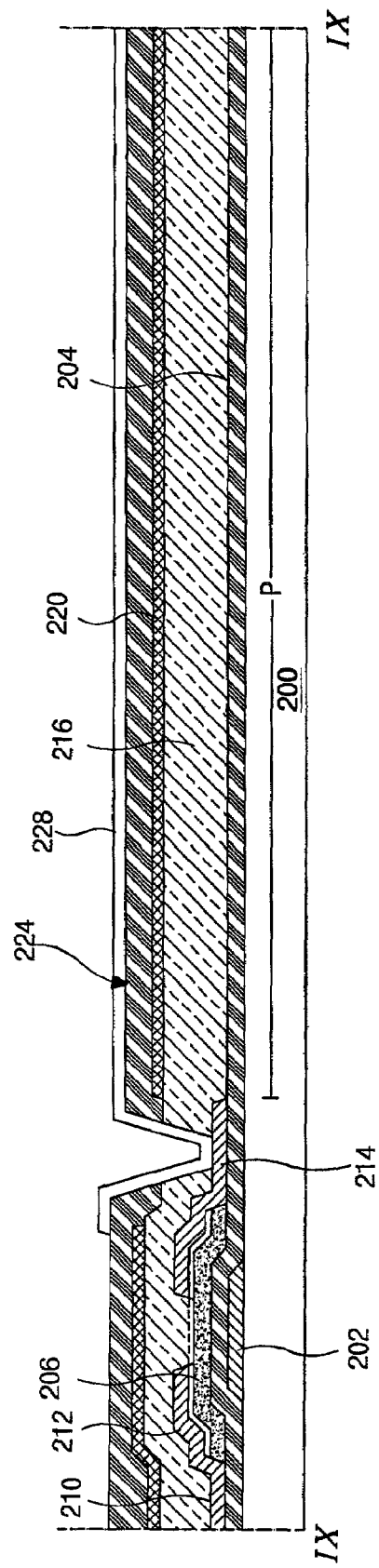

In FIG. 9D, a pixel electrode 228 connected to the drain electrode 214 is formed on the third insulating layer 224 in the pixel region "P" by depositing and patterning one of a transparent conductive metal group including ITO and IZO.

Figure 10A:
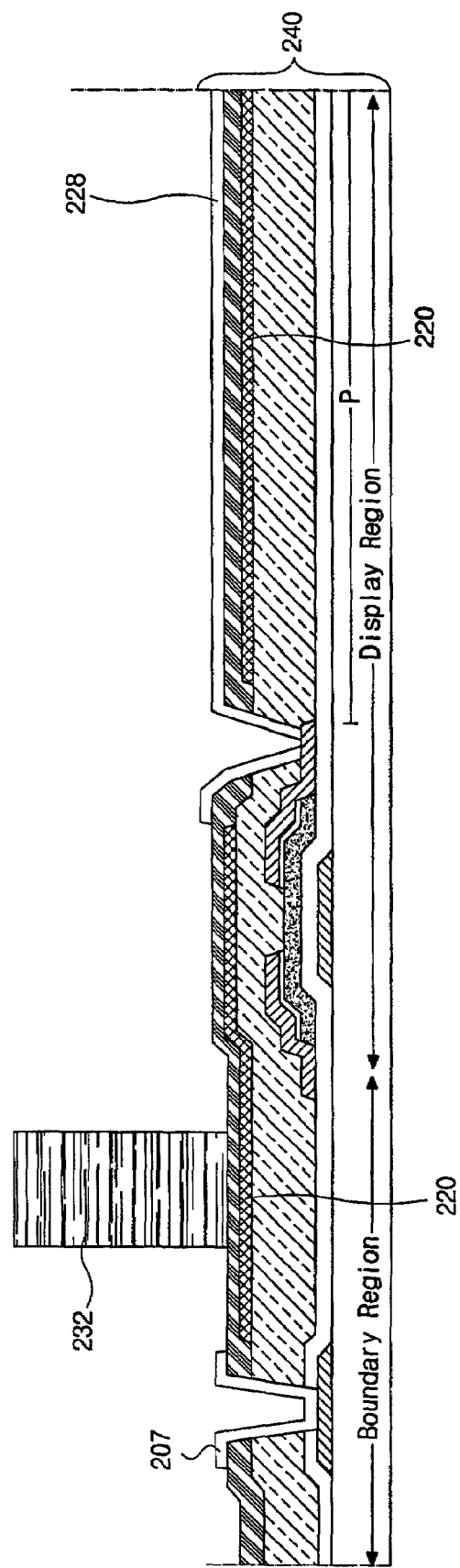
FIGS. 10A to 10C are schematic cross-sectional views showing the steps of a fabricating process of a reflective LCD device according to a second embodiment of the present invention.
Figure 10B:
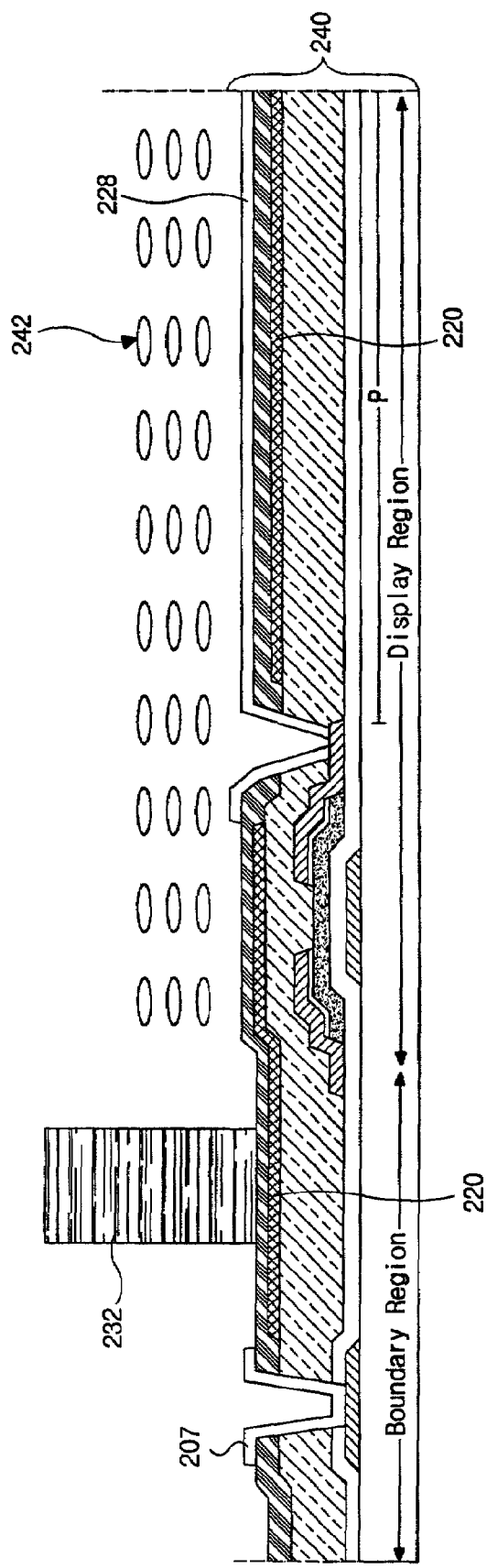
Figure 10C:
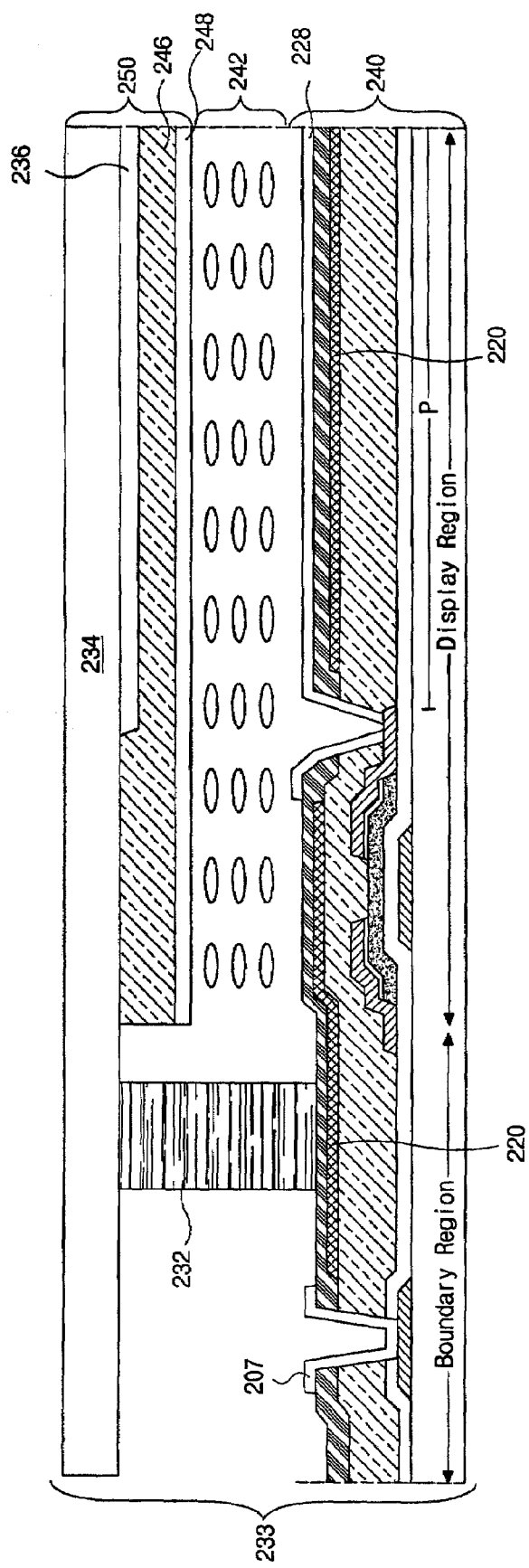

FIGS. 10A to 10C are schematic cross-sectional views showing a fabricating process of a reflective LCD device according to a second embodiment of the present invention.

In FIG. 10A, a light curable sealant 232 is formed at the boundary region of an array substrate 240 produced through the process steps of FIGS. 9A to 9D. The sealant 232 is formed adjacent to a driving part at the boundary of the array substrate 240 and disposed between a signal line (the gate or data lines) and a pad 207 at an end of the gate or data lines.

In FIG. 10B, liquid crystal molecules 242 are dispensed interiorly of the sealant 232 by using a dispenser. As mentioned, since more liquid crystal molecules can fill the interior in a short period of time through the dispensing method, the process time can be substantially reduced.

In FIG. 10C, a color filter substrate 250 is attached to the array substrate 240 to form the liquid crystal panel 233. A color filter layer 236, a planarization layer 246 and a common electrode 248 are subsequently formed on a substrate 234 to produce the color filter substrate 250. The color filter layer 236 of the color filter substrate 250 is formed only at that portion corresponding to the pixel electrode 228 of the array substrate 240. If ultraviolet (UV) light is irradiated from an upper part of the color filter substrate 250, the sealant 232 at the boundary of the liquid crystal panel 233 is hardened so that the attachment of the color filter substrate 250 and the array substrate 240 becomes firmer.

In the second embodiment, the reflective plate 220 does not include a transmission hole corresponding to the pixel region due to the reflective LCD device. Further, the reflective plate 220 is formed on the entire surface of a display region including the pixel region and extended to the boundary region including the sealant, i.e., a region adjacent to the pad 207 so that an additional black matrix over the TFT and shield mask are not necessary.

The transflective or reflective LCD device according to the present invention has a number of advantages.

First, since a reflective plate is formed to cover a TFT of an array substrate and extended to the sealant, a black matrix of a color filter substrate is not necessary and a shield mask screening the pixel region is not necessary since the sealant is hardened with UV light. Therefore, the fabricating process is simplified and a fabrication cost is reduced.

Second, since the black matrix is not formed, a margin for misalignment need not be considered when designing the array substrate. Therefore, it is readily applicable to a small size LCD device.

Third, since the black matrix is not formed, the aperture ratio is improved.

It will be apparent to those skilled in the art that various modifications and variations can be in the fabrication and application of the present invention without departing from the spirit or scope of the invention. Thus it is intended that the present invention cover the modifications an variation thereof provided they come within the scope of the appended claims and their equivalents.

What is claimed is:

1. An array substrate for a transflective liquid crystal display device, comprising:
   a substrate having a display region and a boundary region;
   a gate line disposed on the substrate;
   a first insulating layer disposed on the gate line;
   a data line disposed on the first insulating layer, the data line crossing the gate line and defining a pixel region with the gate line;
   a thin film transistor connected to the gate line and the data line;
   a second insulating layer disposed on the thin film transistor;
   a reflective plate disposed on the second insulating layer at the display region, the reflective plate being extended to the boundary region to where a sealant is to be printed, and the reflective plate having a transmission hole in the pixel region;
   a third insulating layer disposed on the reflective plate; and
   a pixel electrode disposed on the third insulating layer at the pixel region, the pixel electrode being connected to the thin film transistor.

2. The substrate according to claim 1, wherein the reflective plate is electrically floating.

3. The substrate according to claim 1, wherein the reflective plate is not connected to a drain electrode.

4. A transflective liquid crystal display device, comprising:
   first and second substrates spaced apart and facing each other, the second substrate having a display region and a boundary region;
   a common electrode provided on an inner surface of the first substrate;
   a gate line disposed on an inner surface of the second substrate;
   a first insulating layer disposed on the gate line;
   a data line disposed on the first insulating layer, the data line crossing the gate line and defining a pixel region with the gate line;
   a thin film transistor connected to the gate line and the data line;
   a second insulating layer disposed on the thin film transistor;
   a reflective plate disposed on the second insulating layer at the display region, the reflective plate being extended to the boundary region and having a transmission hole in the pixel region;
   a third insulating layer disposed on the reflective plate;
   a pixel electrode disposed on the third insulating layer at the pixel region, the pixel electrode being connected to the thin film transistor;
   a sealant disposed over the reflective plate at the boundary region; and a liquid crystal layer interposed between the common and pixel electrodes.

5. The device according to claim 4, further comprising a color filter layer provided between the first substrate and the common electrode.

6. The device according to claim 5, further comprising a planarization layer provided between the color filter layer and the common electrode.

7. The device according to claim 4, wherein the reflective plate is not connected to a drain electrode.

8. The device according to claim 4, wherein the reflective plate is electrically floating.

9. An array substrate for a reflective liquid crystal display device, comprising:
- a substrate having a display region and a boundary region;
- a gate line disposed on the substrate;
- a first insulating layer disposed on the gate line;
- a data line disposed on the first insulating layer, the data line crossing the gate line and defining a pixel region with the gate line;
- a thin film transistor connected to the gate line and the data line;
- a second insulating layer disposed on the thin film transistor;
- a reflective plate disposed on the second insulating layer at the display region, the reflective plate being extended to the boundary region to where a sealant is to be printed, and the reflective plate having an open portion over the thin film transistor;
- a third insulating layer disposed on the reflective plate; and
- a pixel electrode disposed on the third insulating layer at the pixel region, the pixel electrode being connected to the thin film transistor through the open portion.

10. The substrate according to claim 9, wherein the reflective plate is electrically floating.

11. The substrate according to claim 9, wherein the reflective plate is not connected to a drain electrode.

12. A reflective liquid crystal display device, comprising:
- first and second substrates spaced apart and facing each other, the second substrate having a display region and a boundary region;
- a common electrode provided on an inner surface of the first substrate;
- a gate line disposed on an inner surface of the second substrate;
- a first insulating layer disposed on the gate line;
- a data line disposed on the first insulating layer, the data line crossing the gate line and defining a pixel region with the gate line;
- a thin film transistor connected to the gate line and the data line;
- a second insulating layer disposed on the thin film transistor;
- a reflective plate disposed on the second insulating layer at the display region, the reflective plate being extended to the boundary region and having an open portion over the thin film transistor;
- a third insulating layer disposed on the reflective plate;
- a pixel electrode disposed on the third insulating layer at the pixel region, the pixel electrode being connected to the thin film transistor through the open portion;
- a sealant disposed over the reflective plate at the boundary region; and
- a liquid crystal layer interposed between the common and pixel electrodes.

13. The device according to claim 12, wherein the reflective plate is not connected to a drain electrode.

14. The device according to claim 12, wherein the reflective plate is electrically floating.

* * * * *